United States Patent
Moinuddin et al.

(10) Patent No.: US 11,657,504 B1
(45) Date of Patent: May 23, 2023

(54) SYSTEM AND METHOD FOR COMPUTATIONALLY EFFICIENT ARTIFICIAL INTELLIGENCE BASED POINT-OF-CARE ULTRASOUND IMAGING HEALTHCARE SUPPORT

(71) Applicant: King Abdulaziz University, Jeddah (SA)

(72) Inventors: Muhammad Moinuddin, Jeddah (SA); Ubaid M. Al-Saggaf, Jeddah (SA); Mohammed Jamal Abdulaal, Jeddah (SA); Abdulrahman U. Alsaggaf, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 17/851,485

(22) Filed: Jun. 28, 2022

(51) Int. Cl.
*G06T 7/00* (2017.01)
*G06T 5/00* (2006.01)

(52) U.S. Cl.
CPC ............ *G06T 7/0012* (2013.01); *G06T 5/002* (2013.01); *G06T 2207/10132* (2013.01); *G06T 2207/20024* (2013.01); *G06T 2207/20081* (2013.01); *G06T 2207/20084* (2013.01); *G06T 2207/30024* (2013.01)

(58) Field of Classification Search
None
See application file for complete search history.

(56) References Cited

U.S. PATENT DOCUMENTS

| | | |
|---|---|---|
| 9,934,554 B2 | 4/2018 | Nandi et al. |
| 10,430,688 B2 | 10/2019 | Rao et al. |
| 10,878,219 B2 | 12/2020 | Zhou et al. |
| 2020/0126190 A1* | 4/2020 | Lebel ............... G06T 5/002 |
| 2021/0265042 A1 | 8/2021 | Kim et al. |
| 2021/0393240 A1 | 12/2021 | Han et al. |

OTHER PUBLICATIONS

Chang, Yi, et al. "Two-stage convolutional neural network for medical noise removal via image decomposition." IEEE Transactions on Instrumentation and Measurement 69.6 (2019): 2707-2721. (Year: 2019).*

(Continued)

*Primary Examiner* — Samah A Beg
(74) *Attorney, Agent, or Firm* — WCF IP

(57) ABSTRACT

Systems and methods include a reduced computation, computer-based management of point-of-care (POC) on-site ultrasound (ULS) imaging resources. At a digital computation resource of a POC site, a ULS tissue reflection sample data is received from a hand-held ULS scanning device. A digital computation resource of the POC site, applies a reduced computation tissue ULS reflection speckle noise (SN) physics model—blurring noise (BN) physics model based deep learning (DL) trained convolutional neural network (CNN) denoising process to the ULS tissue reflection sample data outputting an estimated denoised ULS tissue reflection image data. A visual rendering of the estimated denoised ULS tissue reflection image data is displayed on a display resource of the POC site.

11 Claims, 8 Drawing Sheets
(3 of 8 Drawing Sheet(s) Filed in Color)

(56) References Cited

OTHER PUBLICATIONS

Ma, Yingnan, Fei Yang, and Anup Basu. "Edge-guided CNN for Denoising Images from Portable Ultrasound Devices." 2020 25th International Conference on Pattern Recognition (ICPR). IEEE, 2021. (Year: 2021).*

Mafi, Mehdi, et al. "Denoising of ultrasound images affected by combined speckle and Gaussian noise." IET Image Processing 12.12 (2018): 2346-2351. (Year: 2018).*

Lan, Yancheng, and Xuming Zhang. "Real-time ultrasound image despeckling using mixed-attention mechanism based residual UNet." IEEE Access 8 (2020): 195327-195340. (Year: 2020).*

\* cited by examiner

SYSTEM AND METHOD FOR COMPUTATIONALLY EFFICIENT ARTIFICIAL INTELLIGENCE BASED POINT-OF-CARE ULTRASOUND IMAGING HEALTHCARE SUPPORT

BACKGROUND OF THE INVENTION

Technical Field

The invention generally relates to methods and systems of computer-based image processing, in particular, to computationally efficient convolutional neural network, artificial intelligence based ultrasound image noise reduction for healthcare support.

Description of Related Art

Ultrasound imaging (USI) is among the most widely used of the medical imaging techniques available today, and provides a versatile tool for scanning almost all tissues in the body, including abdominal, cardiac, vascular, musculoskeletal, obstetrical, and gynecological imaging, and so forth.

However, USI technology has various shortcomings, some of which are not shared with other medical imaging technologies, e.g., x-rays, magnetic resonance imaging (MRI), and computed tomography (CT) imaging. One example is phase aberration caused by layers of fat interfacing, for example, with muscle or other tissue, due to the unequal speed of sound through these different tissues. Such phase aberration can cause material degradation in image quality. Another shortcoming is a type of noise that is commonly referred to as "speckle noise." Causes can include certain tissue interfaces and certain structural features of major blood vessels that can behave like specular reflectors of ultrasound waves. Another example cause can be blood capillaries and cells within the extracellular space, which can act as scatterers of the ultrasound energy.

Secondary costs of the degradation in image quality arising, for example, from the identified aberration and speckle noise can include necessitating long-term training of practitioners to ensure sufficient skill in identifying signature characteristics of various disease and conditions after reduction or alteration by such noise.

Another secondary cost is a lack of availability of suitable quality portable, hand-held ISI systems. Reasons include a significant percentage of available portable hand-held ultrasound imaging system being generally classifiable as either overly expensive, at least for many applications and environments, or as producing insufficient quality of USI information to be acceptable for many healthcare applications.

There are various conventional techniques directed to enhancing USI images, e.g., various techniques for USI speckle noise filtering, and various techniques for USI deblurring. However, such techniques have shortcomings. One shortcoming of such USI speckle noise filtering and USI deblurring is high computational burden. Use of such techniques can require equipment that features high performance digital processing capability, i.e., has high acquisition cost. Another shortcoming of conventional techniques directed, for example, to USI speckle noise filtering, or USI deblurring, or both, is a requirement for parameter tuning. Still another shortcoming of such techniques is their performance of such algorithms being not up to the mark. There have been efforts directed toward reduction of speckle noise reduction, and these include acquisition methods, wavelet-based methods, local image filtering methods such as anisotropic diffusion, bilateral filter, and the non-local means (NLM). Most of these methods have shortcomings in terms of sensitivity to noise level, selection of patches, selection of algorithm parameters, computational complexity of the algorithm, etc. There are few NLM filters developed for various image processing applications using low-rank information such as noise reduction in images, noise removal in videos, multispectral image denoising, and image deblurring. However, these methods are not suitable for speckle noise removal as there is no specific method to find candidate patches having severe speckle noise patterns present in ultrasound images. A low-rank non-local filtering-based speckle removal system can utilize a guidance image that assists in the selection of candidate patches for non-local filtering. However, low-rank non-local filtering-based speckle removal systems are computationally very expensive.

Since deep learning methods are extremely adaptive, their versatile nature of mimicking training tasks can often lead to a model which can generate unfamiliar outputs. This might not be a critical problem in many general engineering applications, but it is extremely important in clinical applications where the output of the deep learning model only reflects the true nature of the object/subject under observation. Therefore, it is very important that the deep learning model should be designed with theoretical foundations. To do so, we aim to design an artificial intelligence (AI) model by exploring the mathematical link between expected output and theory.

SUMMARY OF THE INVENTION

Other features and advantages of the various embodiments will be set forth in the detailed description that follows, and in part will be apparent from the description or may be learned by practice of the invention. The invention will be realized and attained by the compositions and methods particularly pointed out in the written description and claims hereof.

As will be understood by persons of ordinary skill in the pertinent arts upon reading this disclosure in its entirety, general features and advantages include improved USI image enhancement, e.g., and without limitation, low computational burden concurrent speckle denoising and deblurring. Secondary benefits and advantages are significant. Examples include, but are not limited to, enabling economical, wide-area distribution of large numbers of small point-of-care (POC) healthcare support setups that can be equipped with portable hand-held USI scanners. Advantages can extend to temporary POC healthcare support systems.

Portable handheld USI scanners, performing or offloading for performance on a local low-cost computational resource, e.g., portable "notebook" computing device, of computationally efficient deep-learning (DL) convolutional neural network (CNN) AI processes and architectures in accordance with various embodiments, provide significant improvement in USI image enhancement. Such improvement in USI image enhancement can in turn help POC healthcare providers identify complex anatomical structures in the USI images and diagnose diseases which may be challenging to identify/diagnose by relatively inexperienced POC healthcare practitioners using current conventional USI image processing. This POC advantage can provide larger scale advantages to the entire healthcare system. Examples include, but are not limited to, reduced workload on experienced off-site practitioners of high skill level in USI image readings. Another example advantage can be providing a computationally efficient method for US imaging as well as artefact removal which removes the reliance on expensive computing systems for US imaging and artefact removal. Another example is reducing need of expensive imaging systems, which assist both the experienced and inexperienced healthcare providers in providing reliable care at ease.

Recently, a deep learning-based deconvolution method was proposed that does not require PSF estimation and can directly perform deconvolution on RF data. Similarly, recently a theoretically justifiable deep learning aided ultrasound image enhancement system has been developed where artificial intelligence based speckle denoising is performed for delay-and-sum (DAS) conventional beamforming images on phantom dataset. Motivated by the supporting literature, in this invention, we suggest to expand this idea from high-end programmable systems to low-powered hand-held systems where access to measurement domain is not available. Using an image domain data, we suggest to improve clinically useful features in an adaptive fashion and combine it with deblurring to perform two competing tasks of denoising and deblurring simultaneously.

According to various embodiments can include cloud connectivity makes the access to expert diagnostic opinions very easy as it utilizes internet and cloud connectivity for data storage as well as connectivity with the remote medical specialist team.

Systems in accordance with various embodiments can include a novel flow logic, novel architecture artificial neural network (ANN) machine that includes, among other features multiple, vertically descending population rows of skip connected, multi-rate, multi-kernel, parallel multi-layer convolution modules, with both module internal and inter-module concatenation logic. The physics informed training can include training data generation, include speckle noise model, and can include a blur module. The architecture of the CNN can provide both filtering and deblurring.

Systems can improve clinically useful features in an adaptive fashion and combine this with deblurring to perform two competing tasks of denoising and deblurring simultaneously.

The first task can include an iterative optimization algorithm for the decomposition of low-rank and sparse components of the ultrasound images.

The second task can include a deep neural network model to filter the speckle noise from the base band (in-phase and quadrature: IQ) signal which appears in high frequencies. Since high frequency components also carry the structural details, systems can include a strategy that can help discriminate between the structural and noise components. For example, patch-based non-local filtering can be utilized which will penalize structural loss.

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION

Figure 1:
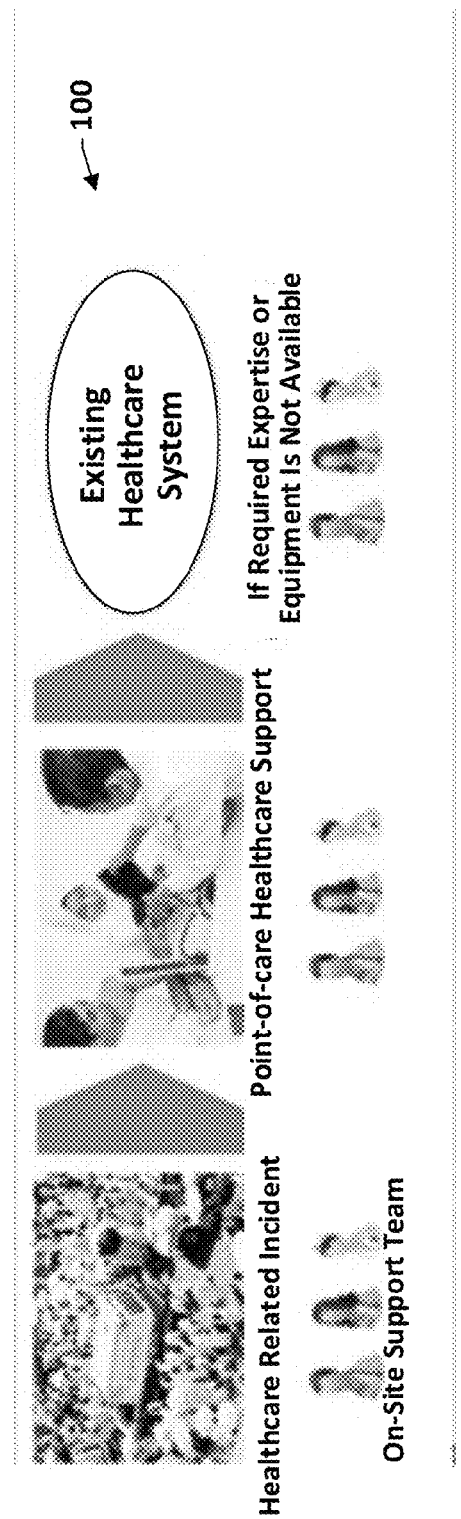
FIG. 1 shows a system diagram of a central system based healthcare support system that includes a POC setup, and shows an example healthcare service flow in the context of the example system.

FIG. 1 shows a system diagram of a central system based healthcare support system 100 that includes a POC setup arranged as dependent on an established healthcare support system, such as a brick-and-mortar hospital, or network of such hospitals. A POC setup can be, for example, a temporary arrangement such as provided by government agencies or by international agencies such as the Red Crescent or Red Cross. These can be provided, e. g., in response to large, temporary gatherings of people, or to natural events such as earthquakes, fires, or floods. ULS scanning, if available, can provide a range of benefits for POC healthcare management, including but not limited triaging of injured persons, and allocation of POC healthcare services, and can have benefits for system-wide healthcare management.

Figure 2:
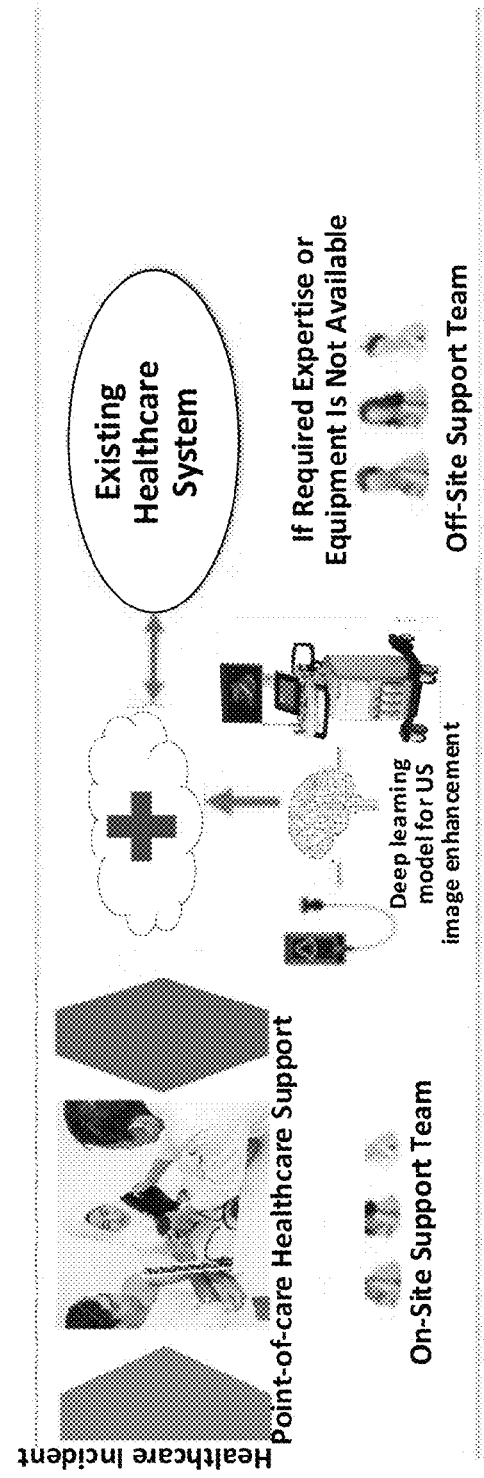
FIG. 2 shows a system diagram of a central system based healthcare support system similar to the FIG. 1 example, in which the central healthcare support system but not the POC setup possesses a high-cost, high computation capability, deep-learning based ultrasound image processing resource, and shows an example healthcare service flow in the context of the example system.

However, for various reasons, POC setups can lack on-site ULS capability. Instead, as shown in FIG. 2, there can be various environments in which central healthcare support systems may possess the currently requisite high-cost, high computation capability ULS imaging resources, such as the illustrative conventional deep-learning based ultrasound image processing resource 202. Reasons can include insufficient numbers of adequately trained practitioners, or lack of acceptable quality ULS equipment, or both. These example reasons can be interrelated, because lower quality ULS equipment can generate lower quality ULS images, e.g., greater image noise, which can obscure or distort signature, malady-specific characteristics in ULS images to an extent that practitioners without high level training and substantial experience can overlook maladies.

As visible in FIG. 1, results of such POC ULS resource limits include transporting of many patients, some unnecessarily, to the central healthcare support system. This can carry multiple costs, including burdening the offsite support team, and expending transport resources. Another cost can be delay, or non-optimal selection of treatment. For example, on-site POC ULS capability can enable rapid, local assessment of injury. This in turn can enable, even if treatment is outside of the scope of POC capability, improvement in selecting off-site treatment location, and can provide the selected off-site treatment facility with advance notification of the patient's condition.

Systems and methods according to disclosed embodiments can provide, via low-computational complexity, deep learning-based ULS image processing, high quality ULS imaging—using hand-held, low-cost ULS equipment. These can provide, for example, widely distributed, POC on-site usable, high power ULS image enhancement and speckle noise reduction. Further features can include cloud-based information storage and distribution. More specifically, in critical medical emergencies, such features can enable uploading from POC setups of high-quality ULS images, accessible to off-site medical expert teams. This can enable, for example, remote consultation in situations when the on-site doctors need consultation from the expert medical team. Embodiments can also provide, for example, in the context of cloud computing, reduced communication overhead by communicating only the noise-filtered clean-up image as opposed to the entire raw data.

Features of systems and methods in accordance with various embodiments can also include computationally efficient method ULS artefact removal. This can enable, for example and without limitation, significant reduction in reliance on expensive computing systems.

The computational efficiency and image quality improvement can make low cost handheld ULS scanners more usable and attractive.

Systems and methods according to various embodiments enable and exploit black-box deep learning models. This can provide for better understanding and further advancements.

Figure 5:
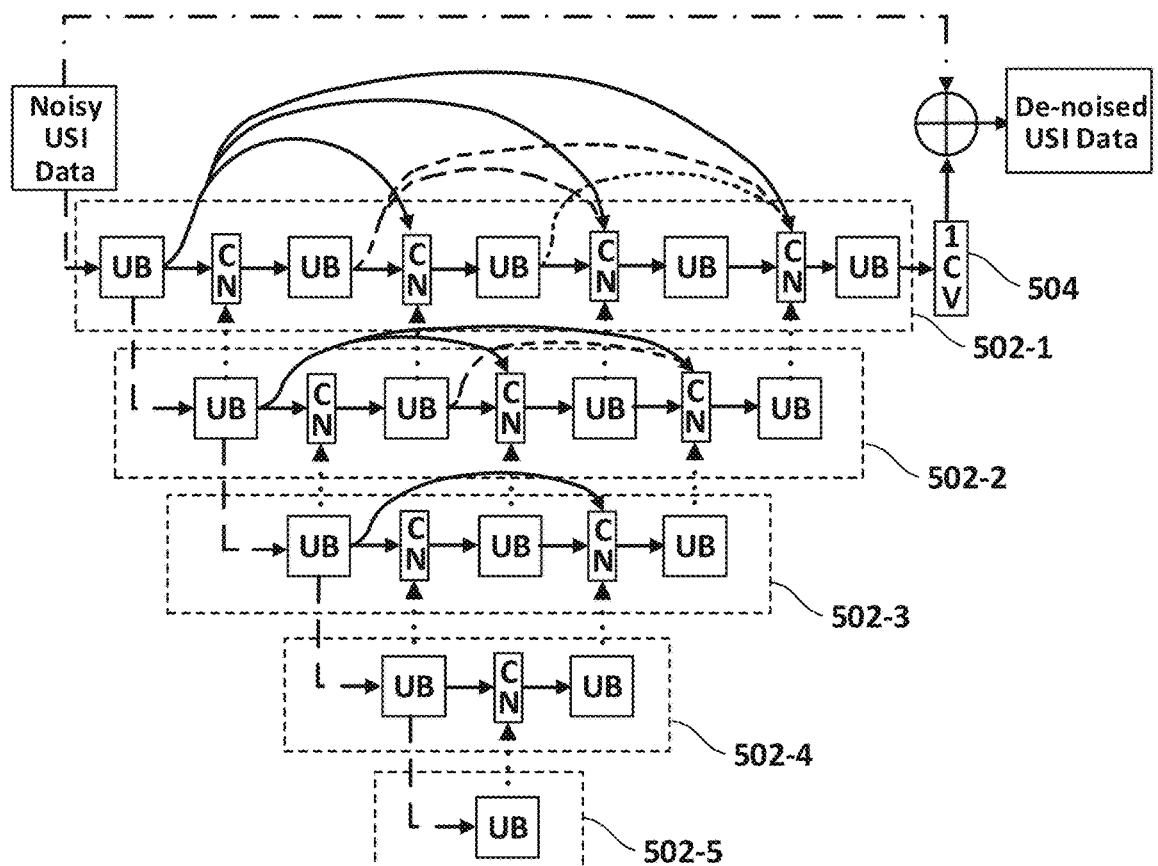
FIG. 5 shows a functional block diagram of one example multi-scale convolution processing configuration of a POC deep-learning based ultrasound imaging and POC-offsite interactive healthcare support system utilizing densely connected skip connections in accordance with various embodiments.

FIG. 5 shows a functional block diagram of one example multi-scale convolution processing configuration of a POC deep-learning based ultrasound imaging and POC-offsite interactive healthcare support system utilizing densely connected skip connections in accordance with various embodiments.

The FIG. 5 example multi-scale convolution processing configuration, as visible on the figure, includes a dense connected first level 502-1 that comprises, shown in left-to-right order on the figure, a first level first unit block (UB), a first level second UB, a first level third UB, a first level fourth UB, and a first level fifth UB. Configuration of the UBs is shown in more detail on FIG. 6.

Referring to FIG. 5, a first level first concatenation block precedes the first level fifth UB, a first level second concatenation block precedes the first level fourth UB, first level third concatenation block precedes the first level third UB, and first level fourth concatenation block precedes the first level second UB.

Also shown on FIG. 5, the first level first UB receives a noisy ultrasound image (USI) data and its output connects to the first level fourth concatenation block that precedes the first level second UB, and connects via a first level first skip link to the first level third concatenation block that precedes the first level third UB, connects via a first level second skip link to the first level second concatenation block that precedes the first level fourth UB, and connects via a first level third skip link to the first level first concatenation block that precedes the first level fifth UB.

Figure 6:
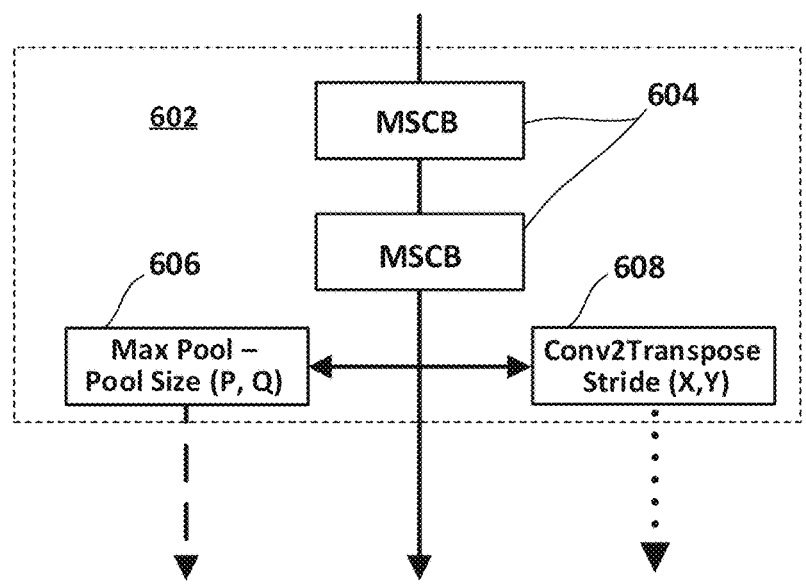
FIG. 6 shows a functional block schematic of an example unit block for system components in accordance with various embodiments.

The above-described outputs of the first level UBs, and the illustrated connections between of the dense connected first level 502-1 and dense connected second level 502-2 can be further understood by reference to the FIG. 6 block schematic of an example UB 602. As visible in FIG. 6, the UB 602 includes multiscale convolutional blocks (MSCBs) 604 coupled to a Max Pool—Pool Size (P, Q) operation 606 transpose stride (X,Y) operations 608. Regarding outputs of the FIG. 6 blocks 604, 606 and 608, output of the Max Pool—Pool Size (P, Q) operation 606 is graphically represented by a dashed line, output of the transpose stride (X,Y) operations 608 is graphically represented by a dotted line, and output of the MSCB 604 is graphically represented by solid line.

Referring to FIGS. 5 and 6, the first level first UB Max Pool—Pool Size (P, Q) 606 output is input to the second level 502-2 first UB, the second level 502-2 first UB Max Pool—Pool Size (P, Q) 606 output is input to the third level 502-3 first UB, the third level 502-3 first UB Max Pool—Pool Size (P, Q) 606 output is input to the fourth level 502-4 first UB, and the fourth level 502-4 first UB Max Pool—Pool Size (P, Q) 606 output is input to the fifth level 502-5 first and, for this example, only UB.

Referring to FIGS. 5 and 6, the second level 502-2 first UB transpose stride (X,Y) 608 output feeds the first level 502-1 fourth concatenation block that precedes the first level second UB, the second level 502-2 second UB transpose stride (X,Y) 608 output feeds the first level 502-1 third concatenation block that precedes the first level third UB, the second level 502-2 third UB transpose stride (X,Y) 608 output feeds the first level 502-1 second concatenation block that precedes the first level fourth UB, and the second level fourth UB transpose stride (X,Y) 608 output feeds the first level first concatenation block that precedes the first level fifth UB.

In a similar arrangement, the third level 502-3 first UB transpose stride (X,Y) 608 output feeds the second level third concatenation block that precedes the second level second UB, the third level second UB transpose stride (X,Y) 608 output feeds the second level second concatenation block that precedes the second level third UB, and the third level third and final UB transpose stride (X,Y) 608 output feeds the second level first concatenation block that precedes the second level fourth and last UB. The fourth level 502-4 first UB transpose stride (X,Y) 608 output feeds the third level 502-3 third concatenation block that precedes the third level second UB, and the fourth level second and last UB transpose stride (X,Y) 608 output feeds the third level 502-3 first concatenation block that precedes the third level third and last UB. Lastly, the fifth level 502-5 UB transpose stride (X,Y) 608 output feeds the fourth level 502-4 concatenation block that precedes the fourth level second and last UB.

Referring to FIG. 5, the second level 502-2 first UB output connects to the second level third concatenation block that precedes the second level second UB, and connects via a second level first skip link to the second level 502-2 second concatenation block that precedes the second level third UB, connects via a first level second skip link to the second level first concatenation block that precedes the second level fourth and last UB. In a similar arrangement, the third level 502-3 first UB output connects to the third level first concatenation block that precedes the third level third and last UB.

Figure 7:
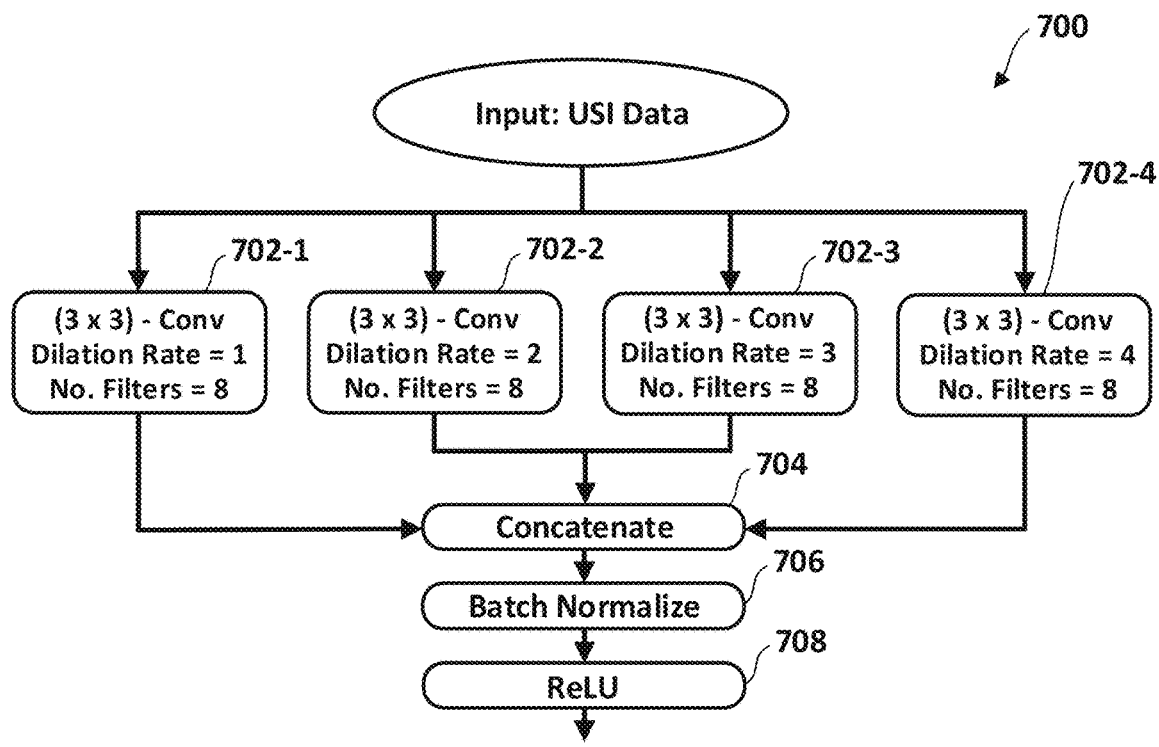
FIG. 7 shows a schematic diagram of a multiscale convolutional block in accordance with various embodiments.

FIG. 7 shows a block diagram regarding an architecture 700 of the multiscale convolutional blocks 604 of the FIG. 6 example unit block (UB) 602 of the FIG. 5 example multi-scale convolution processing configuration. As visible in FIG. 7, UBs can contain 4 convolution layers, shown as 702-1, 702-2, 702-3, and 702-4, each having the same filter size of (3, 3), but having mutually different dilation rates. As visible in FIG. 7, convolution layer 702-1 has a dilation rate of 1, convolution layer 702-2 has a dilation rate of 2, convolution layer 702-3 has a dilation rate of 3, convolution layer 702-4 has a dilation rate of 4. Referring to FIG. 7, outputs of the convolution layers 702-1, 702-2, 702-3, and 702-4 feed a concatenation block 704, which feeds a batch normalize block 706. As also visible on FIG. 7, output of the batch normalize block 706 feeds a ReLU activation block 708.

Systems and methods according to various embodiments can provide:
  Physics informed deep learning;
  Combined filtering, for blurring and speckle noise, using a blurring model and speckle noise model; and
  Densely connected architecture with multi-scale convolution blocks for US image quality enhancement speckle noise model, which can include
    UBs (Unit Block) near the input and the output of the model contain shorter connections—which enables the model to be trained accurately and efficiently Referring to the FIG. 5 concatenation blocks, as seen within the levels 502, features include the respective number of inputs to each concatenation block incrementing by a 1, in step with moving from input to the output, i.e., left-to-right, which provides, without limitation, short skip connections.

As described above in reference to FIG. 7, UBs feature extraction of multi-scale features using simple convolution layers, such as 702-1, 702-2, 702-3, and 702-4, with mutually different dilation rates (i.e., 1, 2, 3, 4).
  Benefits of dilation rates other than 1 include:
    expand the size of the receptive fields;
      enable the learning, preservation, and extraction of high frequency/texture content/features of the US images.
      Referring to FIG. 7, all 4 convolution layers 702-1, 702-2, 702-3, and 702-4 have different dilation rates—benefits include extraction of context information at 4 different scales due to the variation in the size of the receptive fields
    As identified above, the MSCBs 604 are blocks that preserve the contrast/texture information with the help of the multi-scale feature fusion using the parallel convolution layers.
    different dilation configurations—benefits are also twofold;
      can improve texture information,
      can reduce the number of parameters of the network as compared to using the convolution layers with different filter sizes (for e.g. (3, 3), (5, 5), (7, 7), etc.)

As described above, the FIG. 5 dense connected first level 502-1 output can feed, for example a 1×1 convolver block 504, which can provide a depth compression. The 1×1 configuration can provide compression of depth, without necessarily changing the height or width of the noise map.

Techniques for evaluating operation and performance of systems and methods according to various embodiments can include tests using in-vivo USI measurement data and can include tests using phantom data. Example tests using in-vivo USI measurement data can include, but are not limited to, comparison of automatic breast tumor segmentation applied to unfiltered noise filtered in-vivo USI images.

Example tests using phantom data can include, but are not limited to, qualitative analyses using, e.g., any one or more conventional or standard performance measures. Illustrative examples can include, but are not limited to, contrast-to-noise ratio (CNR), peak-signal-to-noise ratio (PSNR), structural similarity index measure (SSIM), full-width at half maximum (FWHM) resolution, and computational complexity.

Figure 3:
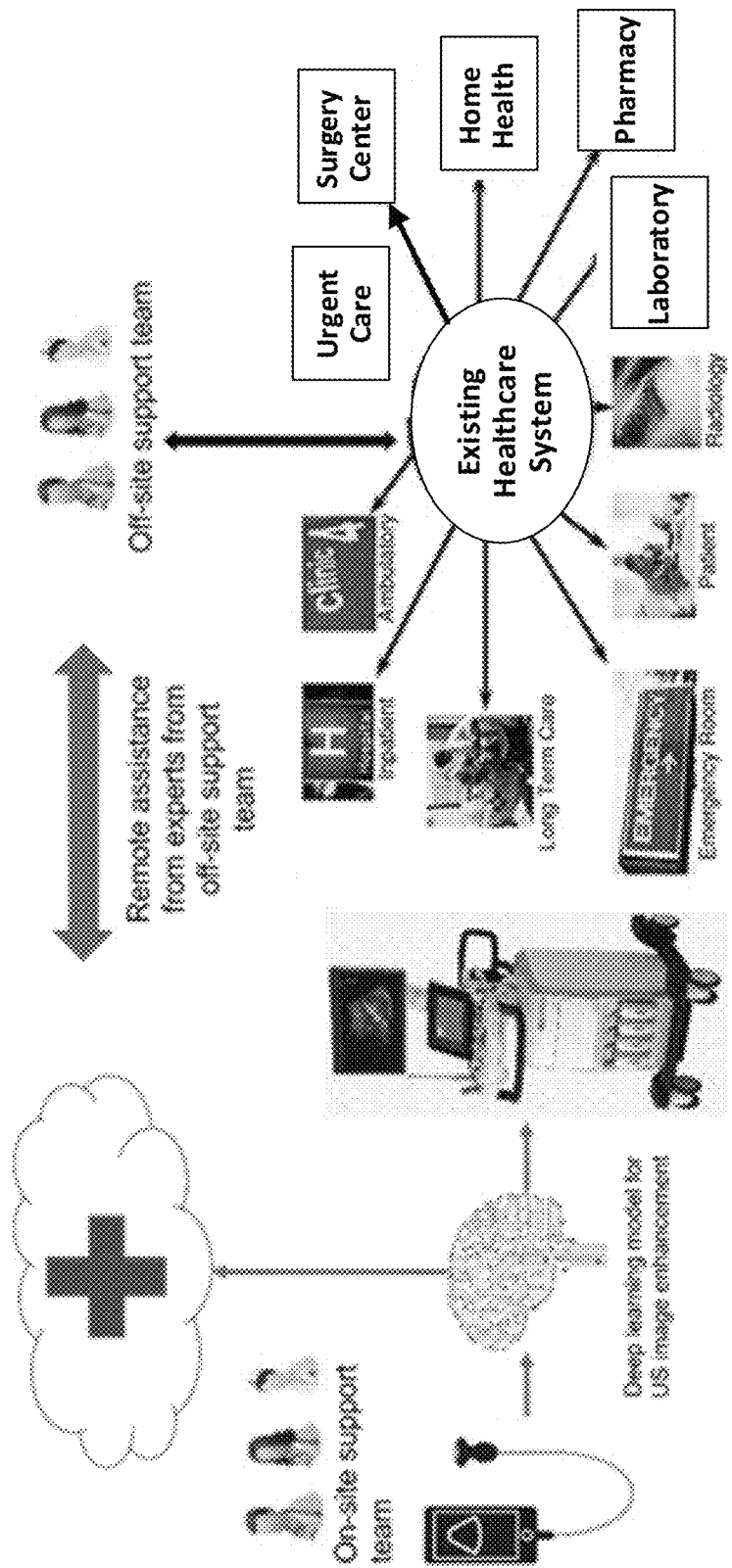
FIG. 3 shows a functional block diagram of an example POC-offsite interactive healthcare support system with an example POC physics-informed DL AI ultrasound image processing system, in accordance with various embodiments.
Figure 4:
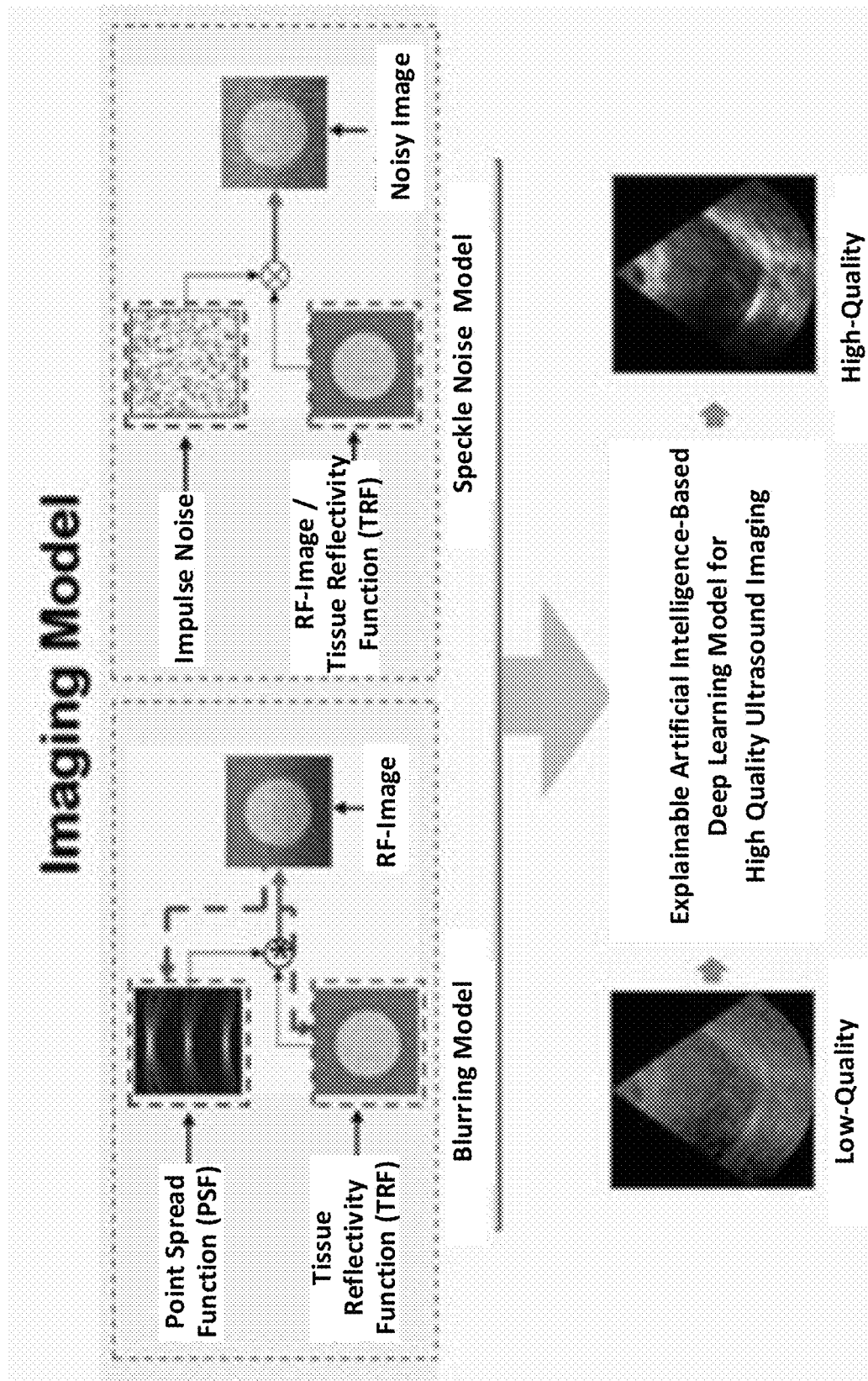
FIG. 4 shows an architecture diagram of an example POC physics informed deep learning based AI system for USI image enhancement in accordance with various embodiments.

For preliminary results, we conducted experiments by implementing the proposed novel AI based US image enhancement system via physics informed deep learning according to the model in FIG. 3. For this purpose, we utilize XPIE dataset and performed the addition of Rayleigh noise and convolution with a Gaussian blurring kernel to generate training dataset pairs. To improve performance, real ultrasound images were filtered using negative log likelihood ratio loss (NLLR).

EXAMPLES

Figure 8A:
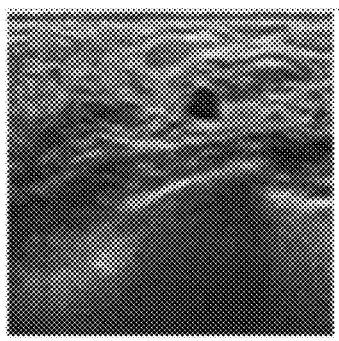
FIGS. 8A and 8B show, respectively, an example USI input to an implementation of a physics informed aware system and method in accordance with one or more embodiments.
Figure 8B:
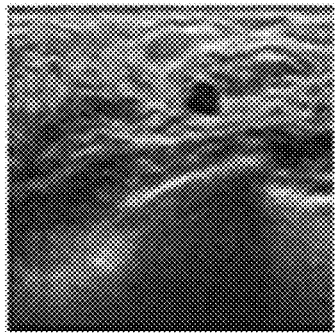

FIGS. 8A and 8B show, respectively, an example ULS input to an implementation of a physics informed aware system and method in accordance with one or more embodiments.

Figure 9A:
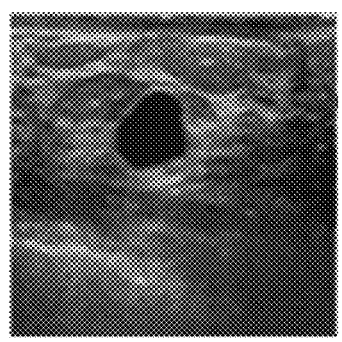
FIGS. 9A and 9B show, respectively, another example ULS input and output of an implementation of a physics informed aware system and method in accordance with one or more embodiments.
Figure 9B:
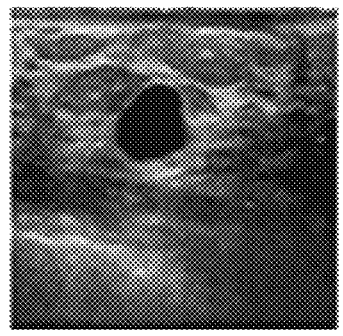

FIGS. 9A and 9B show, respectively, another example ULS input and output of an implementation of a physics informed aware system and method in accordance with one or more embodiments.

Figure 10A:
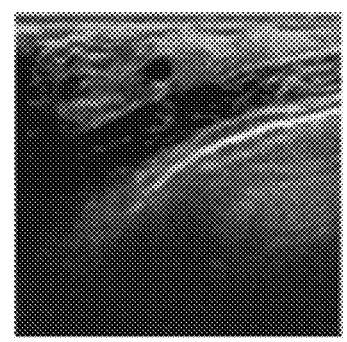
FIGS. 10A and 10B show, respectively, an example ULS input to an implementation of a physics informed aware system and method in accordance with one or more embodiments.
Figure 10B:
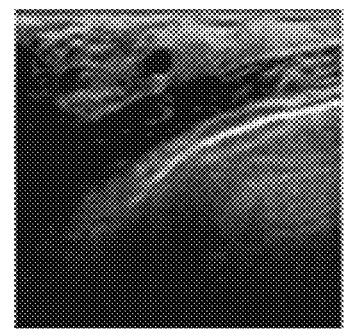

FIGS. 10A and 10B show, respectively an example ULS input to an implementation of a physics informed aware system and method in accordance with one or more embodiments.

Figure 11:
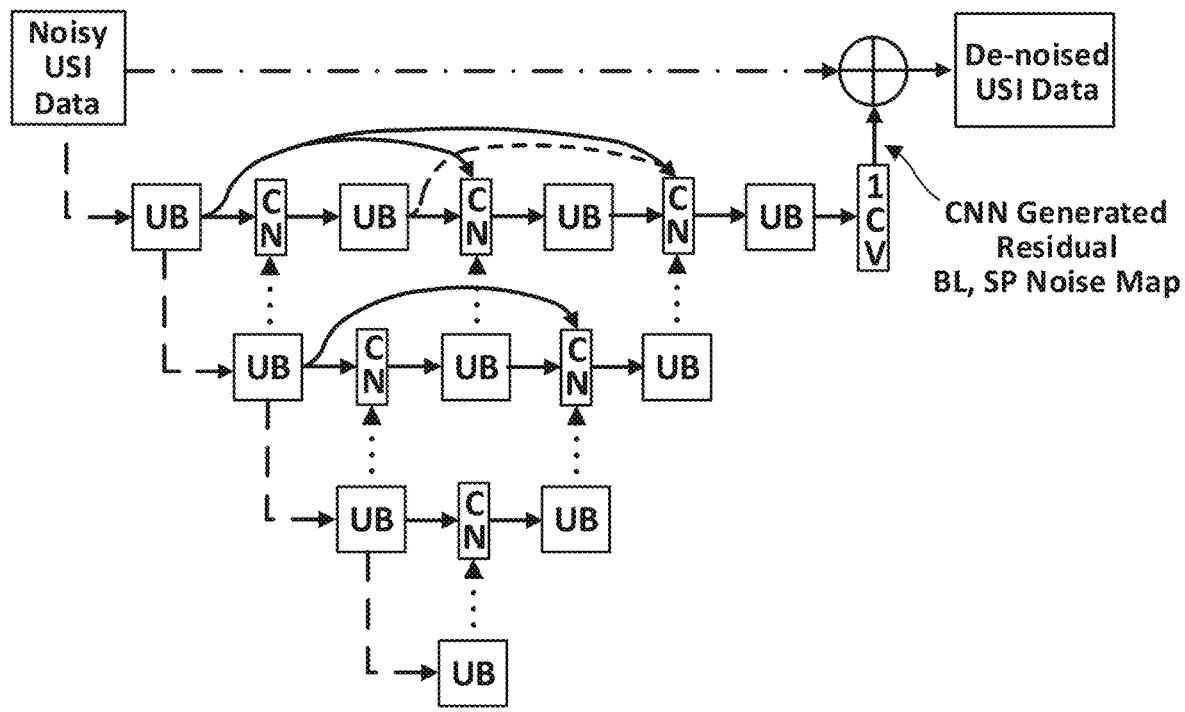
FIG. 11 shows a functional block diagram of another example multi-scale convolution processing configuration, shown as a modification of the FIG. 5 example, for a POC deep-learning based ultrasound imaging and POC-offsite interactive healthcare support system in accordance with various embodiments.

FIG. 11 shows a functional block diagram of another example multi-scale convolution processing configuration, shown as a modification of the FIG. 5 example, for a POC deep-learning based ultrasound imaging and POC-offsite interactive healthcare support system in accordance with various embodiments.

Figure 12:
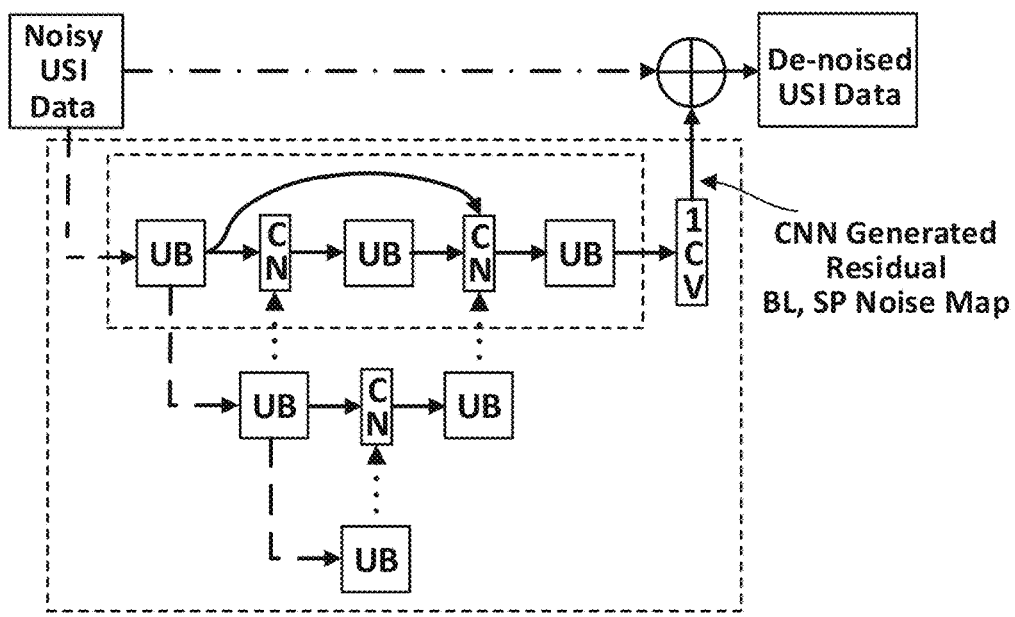
FIG. 12 shows a functional block diagram of another example multi-scale convolution processing configuration, shown as another modification of the FIG. 5 example, for a POC deep-learning based ultrasound imaging and POC-offsite interactive healthcare support system in accordance with various embodiments.

FIG. 12 shows a functional block diagram of another example multi-scale convolution processing configuration, shown as another modification of the FIG. 5 example, for a POC deep-learning based ultrasound imaging and POC-offsite interactive healthcare support system in accordance with various embodiments.

Figure 13:
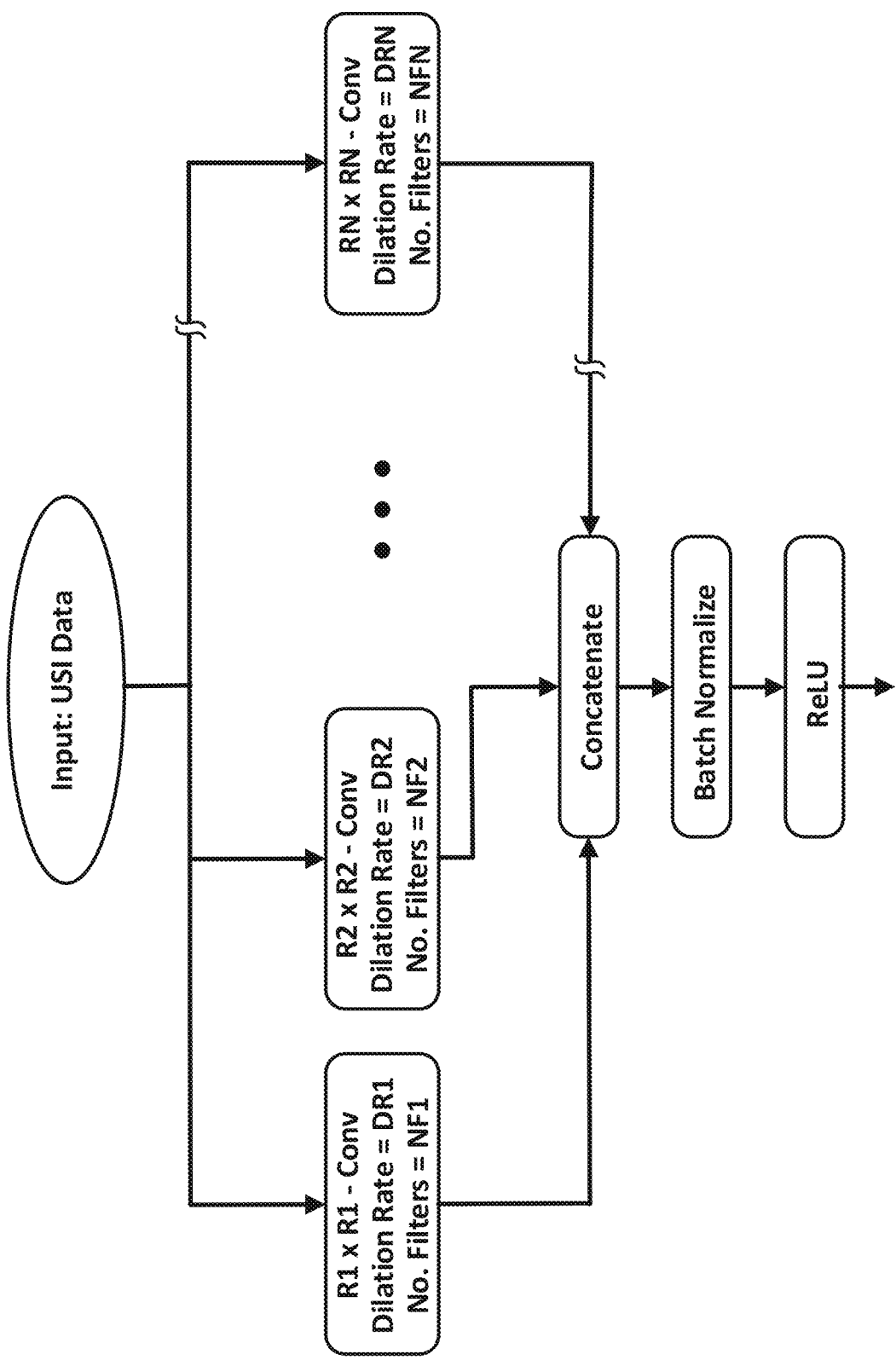
FIG. 13 shows a block diagram of an the architecture of a multiscale convolutional block component of the FIG. 6 unit block.

FIG. 13 shows a block diagram of an architecture of the multiscale convolutional blocks 604 of FIG. 6.

Figure 14:
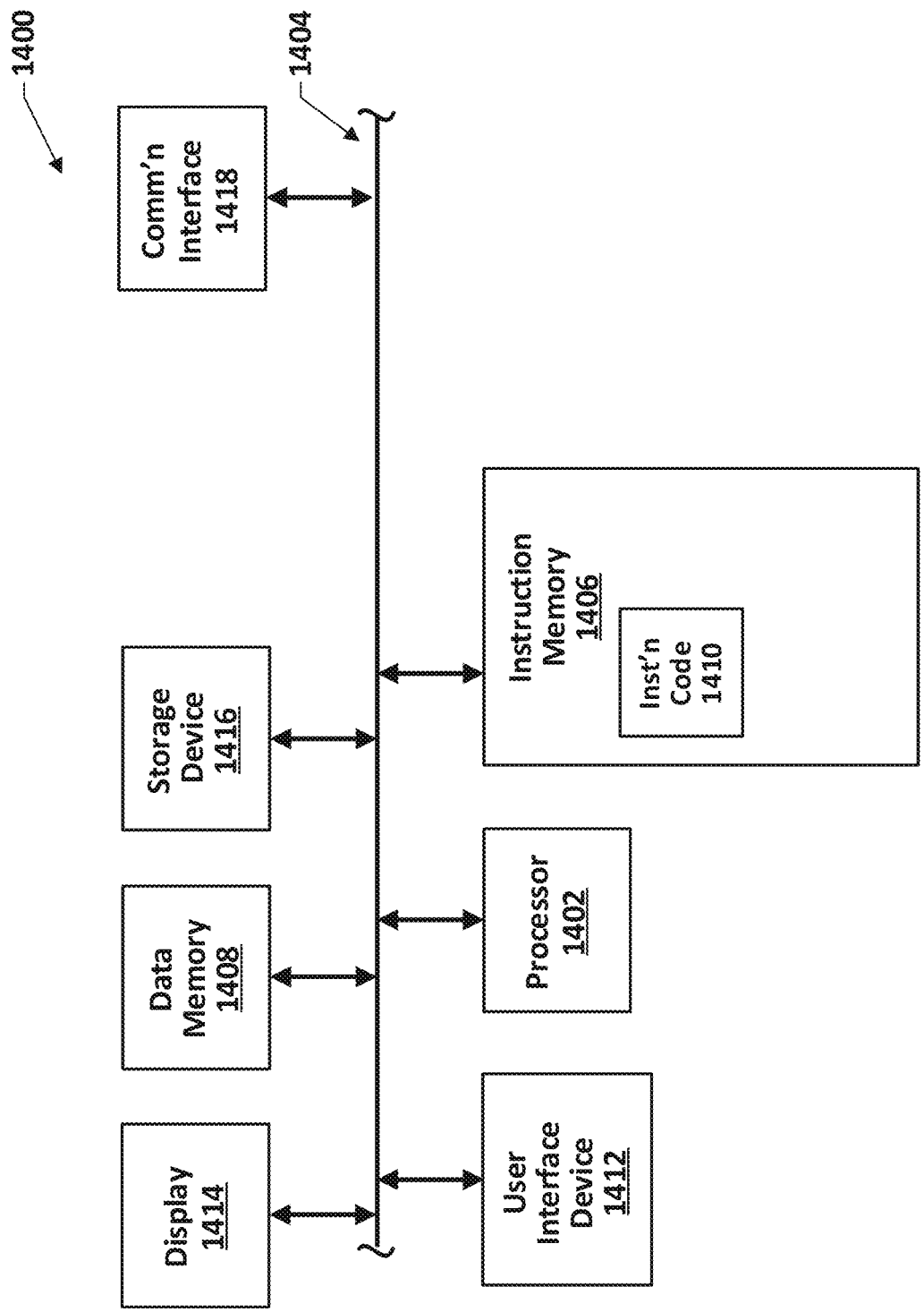
FIG. 14 shows a logic schematic of an example programmable computer system on which systems and methods in accordance with various embodiments may be practiced.

FIG. 14 shows a logic schematic of an example programmable computer system 1400 ("computer system 1400") on which systems and methods in accordance with various embodiments may be practiced. As shown, the computer system 1400 includes a processor 1402 coupled by a bus 1404 to an instruction memory 1406 and a data memory 1408. The computer system 1400 also includes instruction code 1410 stored in the instruction memory 1406. The computer system 1400 of FIG. 14 also includes, coupled to the processor 1402 and other illustrated blocks by the bus 1404, a user interface device 1412, a display 1414, storage device 1416, and a communication interface 1418.

Wireless communications can be, for example a direct communication link, such as Bluetooth, or Bluetooth Low Energy (BLE), or can be performed over a wireless communication network, such as WiFi. In some aspects, a wireless communication is used to transmit signals. Display 1414 can display the results as, e.g. a graph or other visualization.

Also provided are computer-readable media on which the instructions of the present processes are stored. For example, the instructions may be stored in FLASH memory, Secure Digital Random Access Memory (SDRAM), Random Access Memory (RAM), Read Only Memory (ROM), Programmable Read-Only Memory (PROM), Erasable Programmable Read-Only Memory (EPROM), Electrically Erasable Programmable Read Only Memory (EEPROM), solid-state hard disk or any other information processing device with which the processing circuit communicates, such as a server or computer.

Further, the advancements may be provided as a utility application, background daemon, or component of an operating system, or combination thereof, executing in conjunction with processor 1402 and a mobile operating system such as Android, Microsoft™ Windows™ 10 Mobile, Apple iOS™ and other systems known to those skilled in the art.

The requisite hardware elements may be implemented by various circuitry elements known to those skilled in the art. For example, the processor 1402 may be a Qualcomm mobile processor, a Nvidia mobile processor, an Atom™ processor from Intel Corporation of America, a Samsung mobile processor, or an Apple A7 mobile processor, or may be other processor types that would be recognized by one of ordinary skill in the art. Alternatively, the processor 1402 may be implemented on an Field-Programmable Gate Array (FPGA), Application Specific Integrated Circuit (ASIC), Programmable Logic Device (PLD) or using discrete logic circuits, as one of ordinary skill in the art would recognize. Further, processor 1402 may be implemented as multiple processors cooperatively working in parallel to perform the instructions of the inventive processes described above.

Other elements of the system may optionally include a network controller, such as an Intel Ethernet PRO network interface card from Intel Corporation of America, for interfacing with a network. As can be appreciated, the network can be a public network, such as the Internet, or a private network such as LAN or WAN network, or any combination thereof and can also include PSTN or ISDN sub-networks. The network can also be wired, such as an Ethernet network. The processing circuit may include various types of communications processors for wireless communications including 3G, 4G and 5G wireless modems, WiFi, Bluetooth™, GPS, or any other wireless form of communication that is known.

A display controller, such as a NVIDIA™ GeForce™ GTX or Quadro™ graphics adaptor from NVIDIA Corporation of America, may be included for interfacing with a display of the classification results. An I/O interface may interface with e.g. volume control, a microphone, one or more cameras, an audio input or output circuit, etc. The classification results may be output to a screen that is a touch screen, various support elements of which may include Industry Standard Architecture (ISA), Extended Industry Standard Architecture (EISA), Video Electronics Standards Association (VESA), Peripheral Component Interface (PCI), or similar, for interconnecting all of the system.

It is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Unless defined otherwise, all technical and scientific terms used herein have the same meaning as commonly understood by one of ordinary skill in the art to which this invention belongs. Representative illustrative methods and materials are herein described; methods and materials similar or equivalent to those described herein can also be used in the practice or testing of the present invention.

All publications and patents cited in this specification are herein incorporated by reference as if each individual publication or patent were specifically and individually indicated to be incorporated by reference, and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual dates of public availability and may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as support for the recitation in the claims of such exclusive terminology as "solely," "only" and the like in connection with the recitation of claim elements, or use of a "negative" limitations, such as "wherein [a particular feature or element] is absent", or "except for [a particular feature or element]", or "wherein [a particular feature or element] is not present (included, etc.) . . . ".

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

The invention is further described by the following non-limiting examples which further illustrate the invention, and are not intended, nor should they be interpreted to, limit the scope of the invention.

While the invention has been described in terms of its several exemplary embodiments, those skilled in the art will recognize that the invention can be practiced with modification within the spirit and scope of the appended claims. Accordingly, the present invention should not be limited to the embodiments as described above, but should further include all modifications and equivalents thereof within the spirit and scope of the description provided herein.

STATEMENT OF ACKNOWLEDGEMENT

The authors extend their appreciation to the Deputyship for Research & Innovation, Ministry of Education in Saudi Arabia, for funding this research work through the project number (IFPRC-018-135-2020) and King Abdulaziz University, DSR, Jeddah, Saudi Arabia.

We claim:

1. A reduced computation, computer-based method for management of point-of-care (POC) on-site ultrasound (ULS) imaging resources, comprising:
   receiving at a digital computation resource of a POC site, from a hand-held ULS scanning device, a ULS tissue reflection sample data;
   applying, by the digital computation resource of the POC site, a reduced computation ULS tissue reflection speckle noise (SN) physics model—blurring noise (BN) physics model based deep learning (DL) trained convolutional neural network (CNN) denoising processing to the ULS tissue reflection sample data, which outputs an estimated denoised ULS tissue reflection image data; and
   displaying a visual rendering of the estimated denoised ULS tissue reflection image data, on a display resource of the POC site,
   wherein:
     the reduced computation ULS tissue reflection SN physics model—BN physics model based DL trained CNN denoising processing comprises a densely connected block of N multi-rate-multi-filter (MRMF) feature map generating processes, N being an integer, each MRMF feature map generating processing comprises receiving a respective ULS data input and generating, in response, a plurality of different spatial filter feature maps,
     generating at least one of the spatial filter feature maps comprises convolving a respective spatial filter with the respective ULS data input, and feeding a result of the convolving to an activation processing that, in response, outputs the at least one spatial filter feature map,
     the spatial filter comprises a weight,
     the weight is an optimized weight, based on DL training using DL training data corresponding to the ULS tissue reflection SN physics model—BN physics model,
     the activation processing comprises an activation parameter, and
     the activation parameter is an optimized activation parameter, based on the DL training using the DL training data corresponding to the ULS tissue reflection SN physics model—BN physics model.

2. The reduced computation, computer-based method of claim 1 for management of POC on-site ULS imaging resources, further comprising:
   classifying, by the digital computation resource of the POC site, the estimated denoised ULS tissue reflection image, by a threshold quality classification, between a POC service acceptable quality and a POC service unacceptable quality; and
   uploading from the computation resource of the POC site to a cloud resource the estimated denoised ULS tissue reflection image, and an indication of the result of the threshold quality classification.

3. The reduced computation, computer-based method of claim 1 for management of POC on-site ULS imaging resources, wherein
   the plurality of different spatial filter feature maps includes a plurality of first different spatial filter feature maps and a plurality of second different spatial filter feature maps, and
   each MRMF feature map generating process comprises:
     generating the plurality of first different spatial filter feature maps by steps comprising convolving, at a first dilation rate, the ULS data input with a plurality of different first spatial filters, and
     generating the plurality of second different spatial filter feature maps by steps comprising convolving, at a second dilation rate, the ULS data input with a plurality of different second spatial filters.

4. The reduced computation, computer-based method of claim 1, wherein the densely connected block of N MRMF feature map generating processes include a first MRMF feature map generating process, an $N^{th}$ MRMF feature map generating process, and an $(N-1)^{th}$ MRMF feature map generating process, wherein:
   the first MRMF feature map generating process comprises receiving, as its respective ULS data input, the ULS image sample data and generating, in response, a plurality of different first spatial filter feature maps,
   the $(N-1)^{th}$ MRMF feature map generating process comprises receiving, as its respective ULS data input, data that includes the plurality of different first spatial filter feature maps generated by the first MRMF feature map generating process and generating, in response, a plurality of different $(N-1)^{th}$ spatial filter feature maps, and
   the $N^{th}$ MRMF feature map generating process comprises receiving, as its respective ULS data input, data of the plurality of different first spatial filter feature maps generated by the first MRMF feature map generating process and the plurality of different $(N-1)^{th}$ spatial filter feature maps generated by the $(N-1)^{th}$ MRMF feature map generating process and generating, in response, a plurality of different $N^{th}$ spatial filter feature maps.

5. The reduced computation, computer-based method of claim 4, wherein the densely connected block of N MRMF feature map generating processes further includes:
   a first MRMF feature map concatenation process, including receiving a first concatenation input, concatenating the first concatenation input, and feeding a result of the concatenating of the first concatenation input as the respective ULS data input to the $N^{th}$ MRMF feature map generating process, wherein the first concatenation input comprises the data of the plurality of different first spatial filter feature maps generated by the first MRMF feature map generating process and the plurality of different $(N-1)^{th}$ spatial filter feature maps generated by the $(N-1)^{th}$ MRMF feature map generating process; and
   a second MRMF feature map concatenation process, including receiving a second concatenation input, concatenating the second concatenation input, and feeding a result of the concatenating of the second concatenation input as the respective ULS data input to the $(N-1)^{th}$ MRMF feature map generating process, wherein the second concatenation input comprises the data of the plurality of different first spatial filter feature maps generated by the first MRMF feature map generating process.

6. A computer-based system for ultrasound image processing, comprising a processor, coupled via a bus to an instruction memory, a data memory, and a communication interface, the instruction memory including processor-executable instructions that when executed by the processor cause the processor to:

provide a ULS tissue reflection SN physics model—BN physics model based deep learning (DL) trained convolutional neural network (CNN) process block that comprises a densely connected block of N multi-rate-multi-filter (MRMF) feature map generating blocks, N being an integer, each MRMF feature map generating block configured to receive a data input, convolve a respective spatial filter with the respective data input, and feed a result of the convolving to an activation block that comprises an activation parameter, store in the data memory a ultrasound (ULS) tissue image sample data received at the communication interface;

generate a ULS tissue reflection physics informed estimated combination SN—BN map for the ULS tissue image sample data, by operations comprising CNN residual noise estimation that includes to:

input the ULS tissue image sample data as the data input to the using a tissue ULS tissue reflection SN physics model—BN physics model based DL trained CNN process block, and the process block, in response to convolve, by the N MRMF feature map generating blocks, the respective spatial filter with the respective ULS tissue image sample data input, feed a result of the convolving to the activation block, and generate, by the activation block, based on the result of the convolving and the activation parameter, the ULS tissue reflection physics informed estimated combination SN—BN map; and generate an estimated denoised ULS image data, based at least in part on the ULS tissue image sample data and the generated ULS tissue reflection physics informed estimated combination SN—BN map and the estimated combination noise map, wherein the spatial filter comprises a weight that is an optimized weight, the activation parameter is an optimized activation parameter, and the optimized weight and the optimized activation parameter are each based on the DL training using the DL training data corresponding to the ULS tissue reflection SN physics model—BN physics model.

7. The computer-based system of claim 6 for ultrasound image processing, wherein the plurality of different spatial filter feature maps includes a plurality of first different spatial filter feature maps and a plurality of second different spatial filter feature maps, and each MRMF feature map generating block is further configured to:

generate the plurality of first different spatial filter feature maps by convolving, at a first dilation rate, the ULS data input with a plurality of different first spatial filters, and to generate the plurality of second different spatial filter feature maps by convolving, at a second dilation rate, the ULS data input with a plurality of different second spatial filters.

8. The computer-based system of claim 6 for ultrasound image processing, wherein the densely connected block of N MRMF feature map generating blocks include a first MRMF feature map generating block, an $N^{th}$ MRMF feature map generating block, and an $(N-1)^{th}$ MRMF feature map generating block, and the densely connected block of N MRMF feature map generating blocks are in a connection configuration wherein:

the first MRMF feature map generating block is configured to receive, as its respective ULS data input, the ULS tissue image sample data and in response to generate a plurality of different first spatial filter feature maps;

the $(N-1)^{th}$ MRMF feature map generating block is configured to receive, as its respective ULS data input, data that includes the plurality of different first spatial filter feature maps generated by the first MRMF feature map generating block and in response to generate a plurality of different $(N-1)^{th}$ Spatial filter feature maps; and the $N^{th}$ MRMF feature map generating block is configured to receive, as its respective ULS data input, data of the plurality of different first spatial filter feature maps generated by the first MRMF feature map generating block and the plurality of different $(N-1)^{th}$ spatial filter feature maps generated by the $(N-1)^{th}$ MRMF feature map generating block and in response to generate a plurality of different $N^{th}$ spatial filter feature maps.

9. The computer-based system of claim 8 for ultrasound image processing, wherein the densely connected block of N MRMF feature map generating blocks further includes:

a first MRMF feature map concatenation block, configured to a receive a first concatenation input, concatenate the first concatenation input, and feed a result of the concatenation of the first concatenation input as the respective ULS data input to the $N^{th}$ MRMF feature map generating block, the first concatenation input comprising the data of the plurality of different first spatial filter feature maps generated by the first MRMF feature map generating block and the plurality of different $(N-1)^{th}$ spatial filter feature maps generated by the $(N-1)^{th}$ MRMF feature map generating block; and a second MRMF feature map concatenation block, configured to receive a second concatenation input, concatenate the second concatenation input, and feed a result of the concatenation of the second concatenation input as the respective ULS data input to the $(N-1)^{th}$ MRMF feature map generating block, the second concatenation input comprising the data of the plurality of different first spatial filter feature maps generated by the first MRMF feature map generating block.

10. A computer-based method system for ultrasound image processing, comprising processor steps of:

storing in a data memory an ultrasound (ULS) tissue image sample data received at the processor via a communication interface;

generating a ULS tissue reflection physics informed estimated combination speckle noise (SN)—blurring noise (BN) map for the ULS tissue image sample data, by operations comprising convolutional neural network (CNN) residual noise estimation, using a ULS tissue reflection SN physics model—BN physics model based deep learning (DL) trained CNN processing; and generating an estimated denoised ULS image data, based at least in part on the ULS tissue image sample data and the generated ULS reflection physics informed estimated combination SN—BN map, wherein the ULS tissue reflection SN physics model—BN physics model based DL trained CNN processing comprises N multi-rate-multi-filter (MRMF) feature map generating processes, N being an integer, each MRMF feature map generating process comprises receiving a respective ULS data input, and generating, in response, a plurality of different spatial filter feature maps, each MRMF feature map generating processes comprise, for generating at least one of the spatial filter feature maps, convolving a respective spatial filter with the respective ULS data input, feeding a result of the convolving to an activation processing that comprises an activation parameter, and the activation processing, in response, generating the at least one of the spatial filter feature maps, the spatial filter comprises a weight that is an optimized weight based on DL training using DL training data corresponding to the ULS tissue reflection SN physics model—BN physics model, and the activation parameter is an optimized activation parameter based on the DL training using the DL training data corresponding to the ULS tissue reflection SN physics model—BN physics model.

11. The computer-based method of claim 10 for ultrasound image processing, wherein the plurality of different spatial filter feature maps include a plurality of first different spatial filter feature maps and a plurality of second different spatial filter feature maps, wherein each MRMF feature map generating process further comprises:

generating the plurality of first different spatial filter feature maps by steps comprising convolving, at a first dilation rate, the ULS data input with a plurality of different first spatial filters, and generating the plurality of second different spatial filter feature maps by steps comprising convolving, at a second dilation rate, the ULS data input with a plurality of different second spatial filters.

* * * * *

UNITED STATES PATENT AND TRADEMARK OFFICE
CERTIFICATE OF CORRECTION

PATENT NO. : 11,657,504 B1
APPLICATION NO. : 17/851485
DATED : May 23, 2023
INVENTOR(S) : Muhammad Moinuddin et al.

It is certified that error appears in the above-identified patent and that said Letters Patent is hereby corrected as shown below:

In the Specification

Column 11 Line 1 insert:
--STATEMENT OF ACKNOWLEDGEMENT
The authors extend their appreciation to the Deputyship for Research & Innovation, Ministry of Education in Saudi Arabia, for funding this research work through the project number (IFPRC-018-135-2020) and King Abdulaziz University, DSR, Jeddah, Saudi Arabia.--

Signed and Sealed this
Eleventh Day of July, 2023

Katherine Kelly Vidal
*Director of the United States Patent and Trademark Office*